United States Patent

[11] 3,587,938

| [72] | Inventor | Lawrence Russell Brown<br>Grand Forks, N. Dak. |
|------|----------|------|
| [21] | Appl. No. | 815,546 |
| [22] | Filed | Apr. 14, 1969 |
| [45] | Patented | June 28, 1971 |
| [73] | Assignee | AGSCO Chemicals Inc.<br>Grand Forks, N. Dak. |

[54] METERING DEVICE
4 Claims, 9 Drawing Figs.

[52] U.S. Cl............................................... 222/228,
222/407, 222/350
[51] Int. Cl................................................. G01f 11/00
[50] Field of Search........................................ 222/228,
406, 407, 561; 221/260, 208; 198/128; 231/681

[56] References Cited
UNITED STATES PATENTS
2,059,482  11/1936  Olson........................... 222/407

1,730,784  10/1929  Rogginger.................. 222/228X
2,686,045  8/1954  Byberg......................... 222/228X Primary Examiner—Samuel F. Coleman
Assistant Examiner—Norman L. Stack, Jr.
Attorney—Robert E. Kleve ABSTRACT: The invention comprises a metering device having a cylindrical container adapted to receive powdered material, an adaptable sliding valve on the container to open and close an opening in the container, a rotary spoke mechanism at the bottom of the container having a plurality of radially extending spokes with coil springs mounted to the outer ends of the spokes, the coil springs acting to sweep the powdered material toward the opening, a retard and release rod in the container retarding and releasing each coil spring as it reaches the opening with the release of the coil springs creating a whip reaction causing the powdered material to be thrown through the opening.

PATENTED JUN28 1971

INVENTOR
L. Russell Brown

BY Robert E. Klene
ATTORNEY

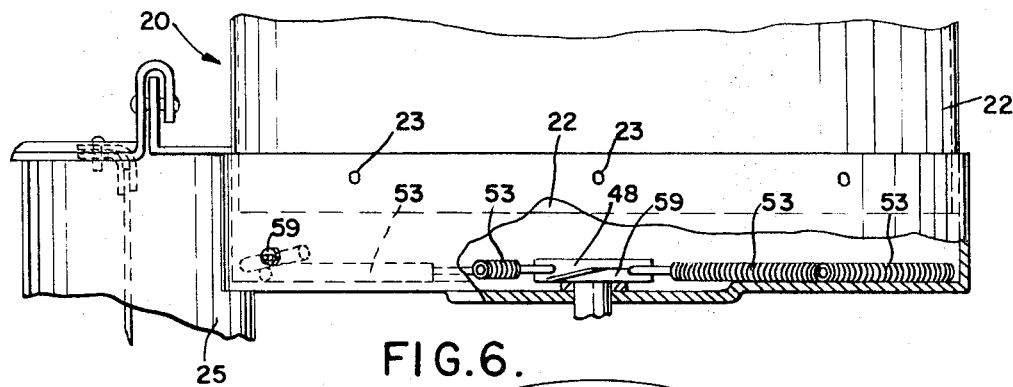
FIG.6.
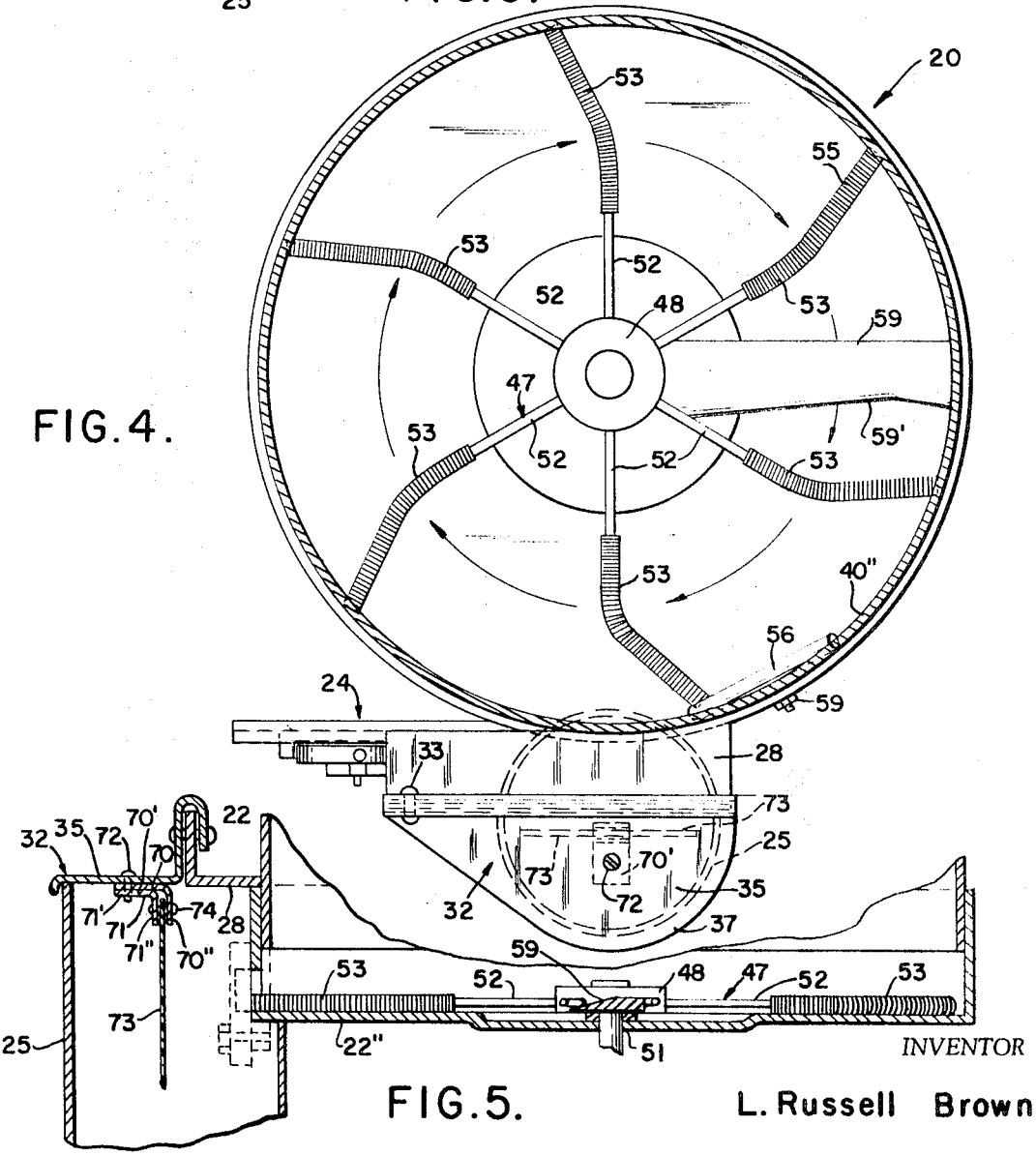
FIG.4.
FIG.5.
INVENTOR
L. Russell Brown
BY Robert E. Klene
ATTORNEY INVENTOR
L. Russell Brown BY Robert E. Kleve
ATTORNEY

METERING DEVICE

The invention relates to metering devices, more particularly, the invention relates to devices for metering powdered materials.

It is an object of the invention to provide a novel metering device for metering finely powdered material in an accurate manner.

It is a further object of the invention to provide a novel metering device for metering powdered materials out of a container accurately and at definite intervals.

It is another object of the invention to provide a novel metering device for metering out powdered material in accurate relatively minute quantities.

Further object and advantages of the invention will become apparent as the description proceeds and when taken in conjunction with the accompanying drawing wherein:

FIG. 4 is a cross-sectional view taken along line 4-4 of FIG. 2.

FIG. 5 is a cross-sectional view taken along line 5-5 of FIG. 7.

FIG. 6 is a fragmentary enlarged left side elevational view of the metering invention taken along line 6-6 of FIG. 4.

Briefly stated, the invention comprises a metering device having a cylindrical container adapted to receive powdered material therein, an adjustable sliding valve mounted to the lower edge of said container, rotary spoke mechanism rotatably mounted to the bottom of said container having a plurality of radial extending spokes with coil springs mounted to the outer ends of the spokes and with the spoke mechanism adapted to rotate, with the coil springs sweeping the bottom of the container, the container having an opening along its bottom side edge with the valve acting to open and close the opening, a guide rod mounted to the inside bottom of the container adjacent the opening, said coil springs adapted to sweep the powdered material into the opening at regular intervals and engage the guide rod just prior to the opening, with the engagement of the springs to the guide rod causing the spring to flex backward momentarily and then be suddenly released to spring toward the opening to provide a throwing action to forcefully move the powdered material through the opening, a resilient curtain mounted outside the opening to deflect the powdered material downward that was thrown through the opening.

Figure 1:
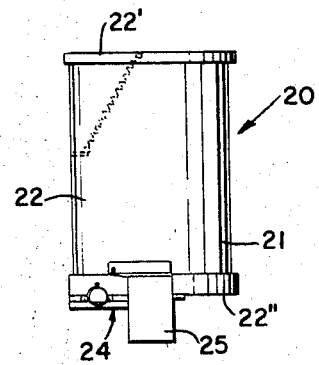
FIG. 1 is a front elevational view of the metering invention.
Figure 2:
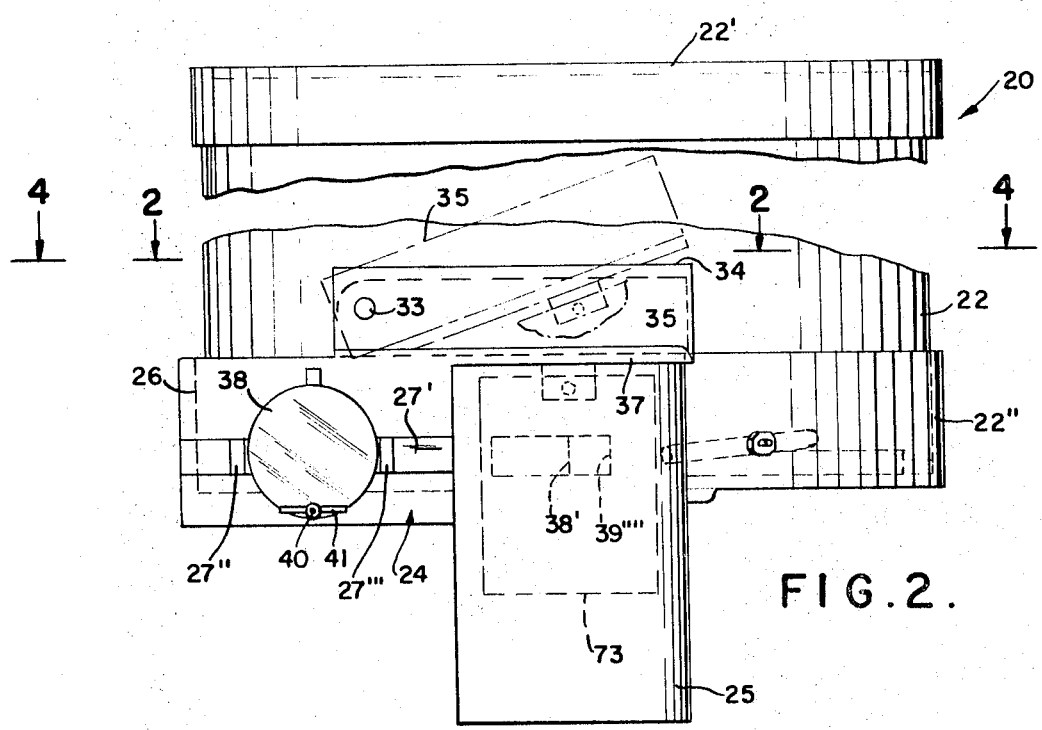
FIG. 2 is an enlarged front elevational view of the metering invention.
Figure 3:
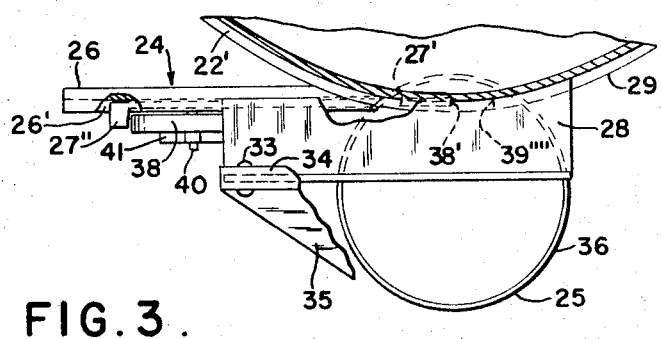
FIG. 3 is an enlarged cross-sectional view of the metering invention taken along line 3-3 of FIG. 2 and with portions broken away to reveal the interior construction.

Referring more particularly to the drawings in FIGS. 1 and 2, the metering invention 20 is illustrated having a cylindrical container 21 with a sleeve portion 22 and upper and lower caps 22' and 22" covering the tops and bottoms of the container, and with the upper cap 22' being slidably removable and with the lower cap 22" screwed to the sleeve 22 by bolts 23.

A metering valve mechanism 24 is mounted to the lower cap 22". A spout 25 is also mounted to the lower cap 22" adjacent the valve mechanism.

The valve mechanism 24 has an elongated upright plate member 26 which plate member has an elongated channel 26' horizontally along its length which serves as a guideway for the slide valve 27. The plate member 26 has its inner edge 26" welded to the lower cap 22" on one side and welded to the spout 25 on the other side, to permanently fix the support plate, lower cap and spout together.

A horizontal plate 28 is welded to the top edge 29 of the lower cap 22" and extends horizontally outward to cover approximately half of the top edge 30 of the spout 25 and the horizontal plate 28 has an upturned flange portion 31 at its outer edge which extends vertically upward therefrom. The plate 28 is welded to the top edge 30 at the spout.

A pivotally mounted spout cover 32 has a metal U-shaped channel portion 34 which is adapted to be slidably received over the vertical flange portion 31 at the horizontal plate member and the cover 32 is pivotally mounted to the vertical flange portion 31 by a rivet 33 and is adapted to pivot upward from its horizontal position shown in solid lines in FIG. 2, to its position shown in dashed lines in FIG. 2 and designated by numeral 35 on to a straight vertical position.

The spout cover also has a laterally extending semicircular plate portion 35 which extends laterally over the outer one-half of the top 36 of the spout, so that when the spout cover is pivoted downward to its position shown in solid lines in FIG. 2 it will cover the outer top portion 36 at the spout. The semicircular plate portion 35 also has a downturned annular edge portion 37 which drapes downward over the outer edge of the spout to more completely close outer top portion 36.

The slide valve 27 has an elongated plate portion 27' which extends along the channel 26'. The plate portion has a pair of projecting ridges 27" and 27"' on opposite side of a metal disc 38. The metal disc 38 is pivotally mounted to a pin 40 to pivot about the horizontal axis of pin 40. The pin 40 is fixed to the upright plate member 26. A wingnut 41 is threaded onto the pin 40 to tighten the disc against the plate 26 and thereby lock the slide valve in an adjusted position.

The movement of the disc 38 in either direction about the axis of pin 40 causes the slide valve 27 to slide in either direction by its engagement against either ridge 27" or 27"' depending upon the direction of movement which turns the slide valve in the corresponding direction.

Figure 7:
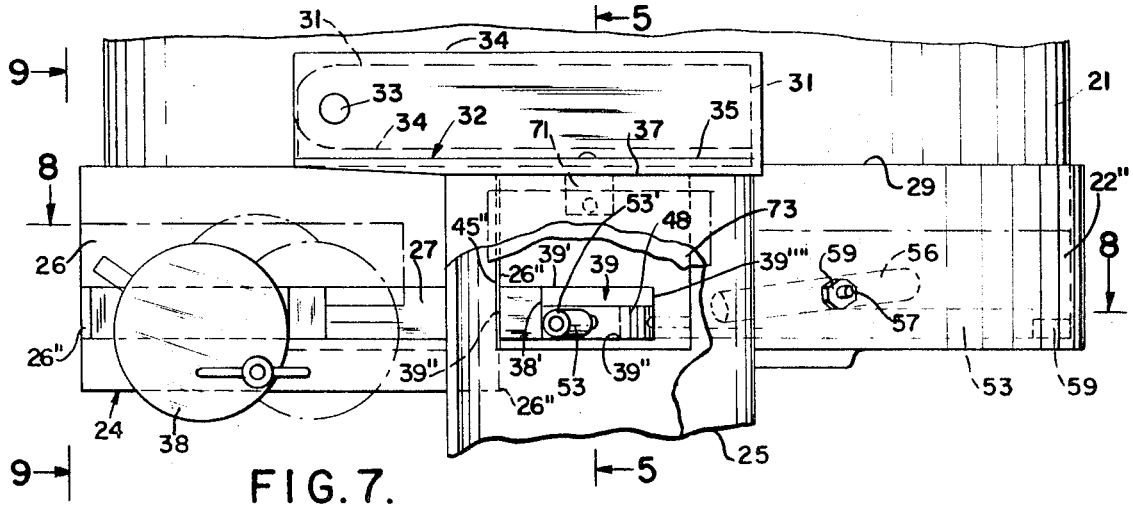
FIG. 7 is a further enlarged front elevational view of the metering invention, illustrating the metering valve in its full open position.
Figure 8:
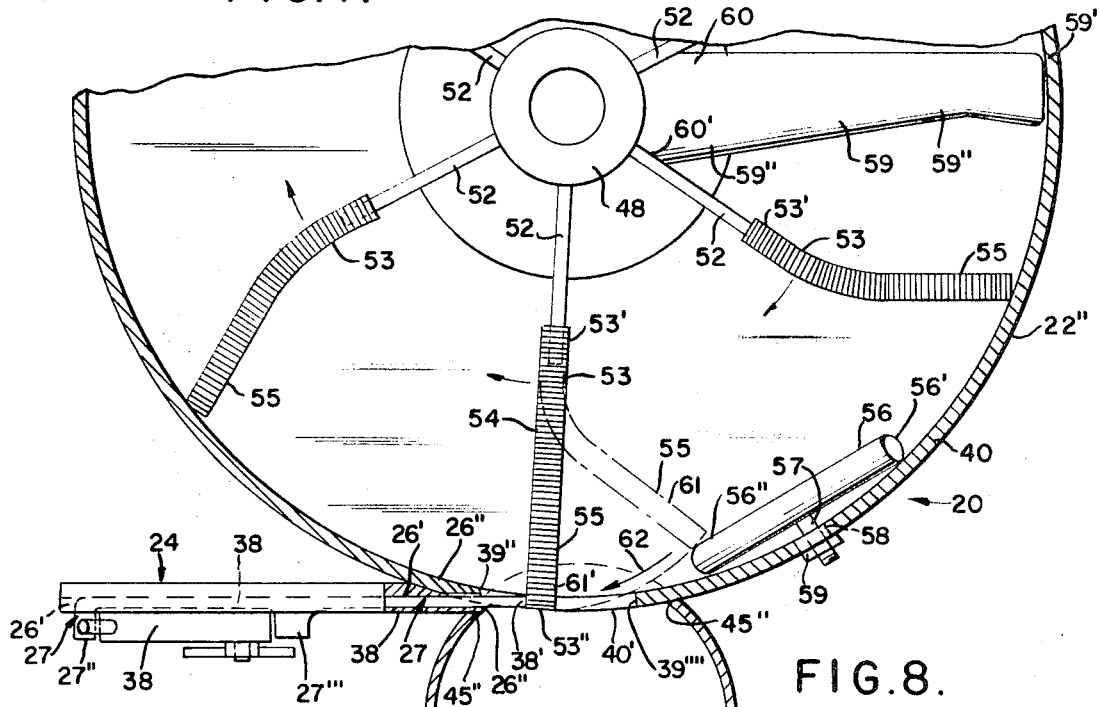
FIG. 8 is a cross-sectional view taken along line 8-8 of FIG. 7.
Figure 9:
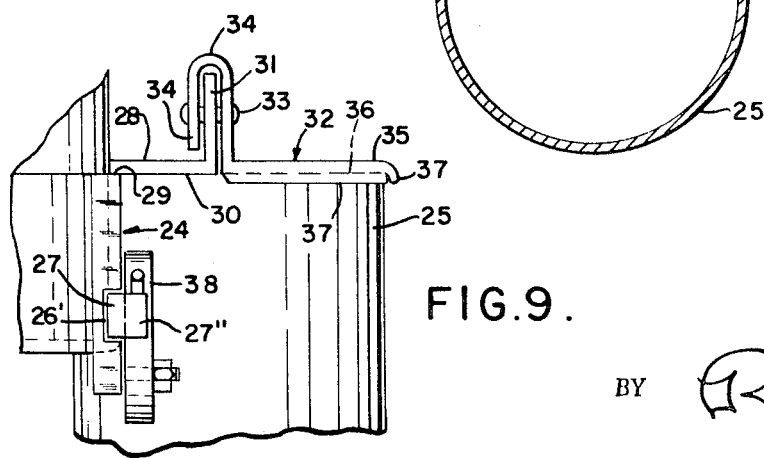
FIG. 9 is a fragmentary right side elevational view of the metering invention taken along line 9-9 of FIG. 7.

The disc 38 when in its far left position shown in solid lines, in FIG. 7, the forward end 27"" of the slide valve is at its full open position with respect to the elongated slotted opening 39 in the sidewall 40 of the bottom cap. The slotted opening 39 has an upper and lower edge 39' and 39" and a left and right edge 39'" and 39"", respectively.

The disc member 38 can pivot from its position shown in solid lines in FIG. 7 and designated by numeral 41 to its intermediate position shown in dashed lines in FIG. 7 (shown in solid lines in FIG. 2) and designated by numeral 42 to its far right position shown in dashed lines and designated by numeral 43 in FIG. 7, or any intermediate position.

The movement of the disc 38 to its far right position causes the slide valve 27 to be covered to a completely closed position by moving the forward edge 27"" of the slide valve into slotting relation against the far right edge 39"' of the slot 39 in the sidewall 40 of the bottom cover 22" thus closing the opening.

The movement of the disc member to its far left position shown in solid lines in FIG. 7 causes the slide valve to be covered to a full open position with the forward edge 27"" of the slide valve spaced a substantial distance away from the right edge 39"' of the opening and thus the opening 39 is completely open.

The spout 25 has a U-shaped cutout portion 44 with the bottom edge 44' of the cutout portion of the spout abutting the bottom face 45 of the cover 22" and with the right side edges 45' abutting the sidewall 40 of the bottom cover 22" and the left front edge 45" abutting the plate member 26.

The far left edge 39"' of the slotted opening is tapered back along its thickness 46 to allow the plate portion 27' of the slide valve to slide freely into the opening 39.

A spoke mechanism 47 is mounted axially with the bottom cover 22". The spoke mechanism 47 has a center disc 48 which rotatably mounted to the center of the base 49 of the bottom cover 22" and a shaft 50 fixed axially to the disc 48, passes through a bore 51 in the bottom 49. A conventional motor (not shown) drives the shaft and thereby rotates the disc 48.

Six radial rods 52 extend radially outward from the disc 48 and are fixed thereto. Six coil springs 53 have their inner ends 53' press fitted over the outer ends 52' of the rods. The coil springs 53, when in their straight position, as illustrated by coil spring 54 of the coil spring 53 have their outermost end 53" terminating equal to the outside radius or edge 40' of the sidewall 40 of the bottom cover 22". Thus, since the combined radius of the disc and any one of the rods to its corresponding spring is equal to the outside radius of the sidewall 40 of the bottom cover 22", when the six springs 53 are rotated by the disc and rods, they let their outer portions 55 flex backward as illustrated in FIGS. 4 and 7 as they will scrape against the inside of the wall 40 as the springs are rotated.

A guide rod 56 is mounted to the inside of wall 40 at the bottom cover 22", by means of a lateral pin 57 fixed centrally to the rod 56 and extending laterally therefrom through a bore 58 in the sidewall 40, and a nut 59 is threaded onto the pin 57 to tighten the rod 56 to its position shown in FIGS. 2, 4, 7 and 8. The bore 58 is oversized with respect to the pin 57 so that the rod 56 may be adjusted slightly and the rod may also be adjusted axially.

A blade 59 is fixed to the center disc 48 and has its inner edges 60 and 60' fixed to the adjacent rods 52. The blade extends horizontally and axially away from the disc 48 with its outermost edge 59' terminating and adjacent the inside of the wall 40 of the bottom cover 22". The blade 59 will rotate with the disc 48 and has its forward edge 59" tapered to form a cutting edge along its length, with the cutting edge cutting into powdered material thus preventing the powdered material from packing against the bottom of the cover 22" and acts to sweep the bottom of the cover 22". Mounted to the underside of the spout cover 32 are a pair of L-shaped plates 70 and 71, mounted in parallelis with one another with their one legs 70' and 71' screwed to the underside of the plate portion 35 of the cover 32 by a screw 72. A resilient rectangular curtain 73 made of rubber is mounted between the other legs 70" and 71" of the L-shaped plates with a screw 74 threaded through the legs 70" and 71" and through the curtain 73 to attach the curtain to the cover 32. The curtain 73 drapes down vertically in the spout 25.

OPERATION

The metering invention 20 operates as follows:

The metering invention will be mounted in a conventional manner to the inside of the box of a conventional grain truck at the top of the rear wall of the truck and will feed powdered chemical onto the grain in the truck immediately above the location of the grain entrance of a grain auger drawing grain out of the truck. The drawing of the grain into the grain auger will draw the powdered chemical, being fed by the invention, into the grain auger where the action of the grain auger in rotating will mix the powdered chemical with the grain to cause the grain to be coated with the powdered chemical. The invention 20 is intended principally for use in metering out a finely powdered nonflowable pesticide dust which dust is widely used commercially and does not want to flow. The reason that this chemical resists flowing is that the nature of the powdered chemical tends to be such that it will adhere to the seeds or grain.

The metering invention will be filled with pesticide dust by slidably removing the cover 22''. A coil spring 60 has one end 60' hooked to a hook on the underside of the cover 22' and the other end 60'' is hooked onto a hook on the side of the sleeve 22 of the container, with the spring urging the cover 22' in place on the sleeve 22 yet having enough expansion to allow the cover 22' to be slid off to one side for filling the bottom cover 22'' and the sleeve 22 to near the top of the sleeve 22.

The operation will energize the motor which will rotate the spoke mechanism including the disc 48, as its radial rods and coil springs. As the coil springs are rotated, their outermost ends 53'' will scrape against the inside 40'' of the wall 40 and their outer portions 55 will flex backward as illustrated in FIGS. 4 and 7, since the coil springs are larger than the inside radius of the wall 40.

As each coil spring 53 rotates it will push the pesticide dust ahead of its, and as each coil spring reaches the guide rod 56, and since the outer end 56' of the rod is higher than the coil springs, the coil spring 53 will pass under the guide rod and when the coil spring 53 reaches the lower end 56'' of the guide rod, it will be flexed back further than before, to its position shown in phantom lines in FIG. 7, and designated by numeral 61 until the coil spring 53 cleared the lower end 56'' of the rod. FIG. 7 shows the coil spring at the instant it clears the guide rod in phantom lines. The instant the coil spring 54 clears the lower end 56'' of the guide rod, the spring reaction of the coil spring 54 will whip the outer end 55 of the coil spring forward in the direction and along the path of the accurate arrow 62, at a rapid rate to its position shown in solid lines in FIG. 7 and designated by numeral 61. This whip action by the outer end of the coil spring 55 when it clears the guide rod 56, will throw the pesticide dust through the opening 39 and against the resilient curtain 73 which curtain will deflect the pesticide dust down out of the spout 25 and into the grain at the intake point of the auger where the dust will be mingled and coated onto the grain.

The dust being essentially nonflowable, it is necessary to have a rapid whip action by the coil spring to suddenly force or throw the pesticide dust through the opening 39. Since simple sprinkling of the dust toward the opening will not enable an accurate metering of the dust through the opening and onto the grain nor will be effective since the dust is nonflowable, thus this whip action of the coil spring is necessary to accurately force even amounts of dust through the opening at regular intervals.

The amount of dust passing through the opening 39 may be varied by adjusting the size of the opening 39 by using the disc to move the slide valve 27 to enlarge or reduce the size of the opening. If the size of the opening is enlarged a larger amount of dust will be thrown through the opening 39 each time as coil springs whip the dust through the opening and accordingly if the size of the opening is reduced a smaller amount of dust will be propelled through the opening each time.

Thus it will be seen that a novel insecticide dust metering device has been provided that will accurately meter nonflowable dust.

It will be obvious that various changes and departures in the invention without departing from the spirit thereof, and accordingly it is not intended that the invention be limited to that specifically described in the specification or as illustrated in the drawing, but only as set forth in the appended claims wherein:

I claim:

1. A metering device for powdered materials comprising a cylindrical container adapted to receive powdered material therein, rotary spoke means mounted to the bottom of said container, said spoke means having coil spring means at its outer end, said container having an opening, a slide valve for regulating the size of the opening, means to retard and release said coil springs with said coil spring upon their release acting to throw the powdered material through said opening.

2. A metering device for metering nonflowable insecticide dust comprising a cylindrical drum adapted to receive insecticide dust therein, a rotatable spoke means within said drum, said drum having a flat annular baseplate with a cylindrical wall surrounding said baseplate and extending upward therefrom, said spoke means having a plurality of radially extending rods, a coil spring mounted to the outer end of each of said rods and extending outwardly therefrom, each of said rods and its coil spring mounted thereon having a combined length slightly longer than the inner radius of the drum, whereby when the spoke means is rotated the outer ends of the coil springs will scrape against the inside surface of the cylindrical wall of the drum and flex slightly backward in relation to the direction of rotation of the spoke means, and with the scraping action moving the insecticide dust along the baseplate ahead of the coil springs and the backward angle of the flexed coil springs directing the dust toward the cylindrical wall, said cylindrical wall having a slotted opening adjacent the baseplate in alignment with the coil springs whereby as the coil springs pass the opening they may be received into the opening by extending toward a straight position, means adjacent the opening further flexing the springs backward and releasing the coil springs causing the springs to whip into the opening with the whip action of the springs into the opening metering out a quantity of the dust through the opening, a rectangular plate slidably mounted in said slotted opening to adjust the size of the opening to thereby regulate the amount of the dust whipped into the opening.

3. A metering device for powdered materials comprising a cylindrical container having a cylindrical wall adapted to receive powdered material therein, a rotary means mounted in the bottom of the container, spring means on said rotary means, said container having an opening in its wall, retard and release means adjacent the opening and flexing said spring means backward and releasing said spring means to cause said spring means to whip into said opening with said whipping action causing powdered material in the bottom of the container to be propelled through the opening, said spring means having a length whereby at the end of said whipping action said spring means will protrude into said opening with the outermost end of the spring means being long enough to be at least substantially flush with the outside surface of said cylindrical wall.

4. A metering device according to claim 3, wherein a blade is mounted to said rotary means beneath said spring means and acts to rotate with said rotary means, said blade having a cutting edge generally parallel to the bottom of the container, said cutting edge projecting in the direction of rotation whereby the blade will act to scrape the bottom of the container.